UNITED STATES PATENT OFFICE.

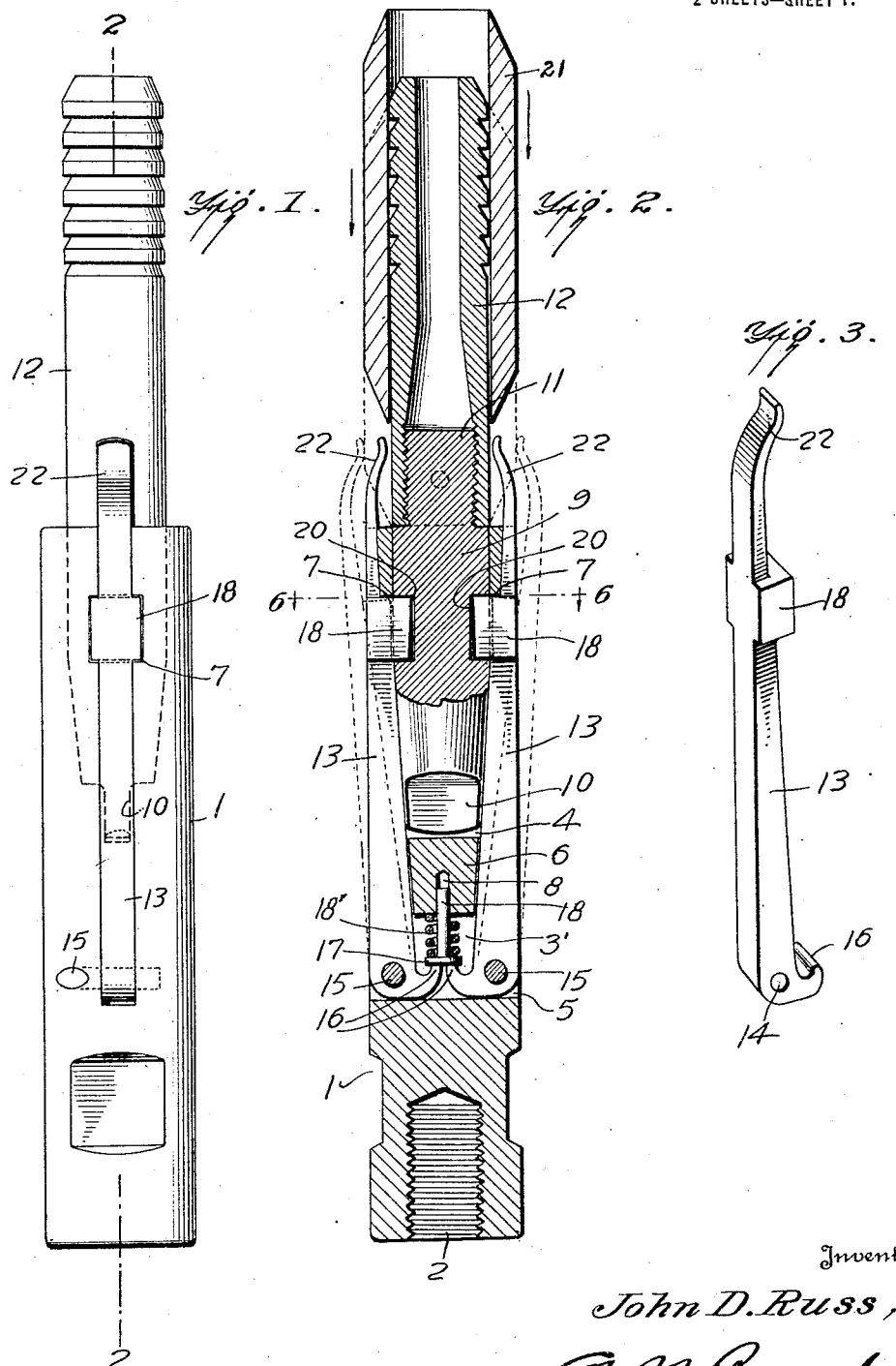

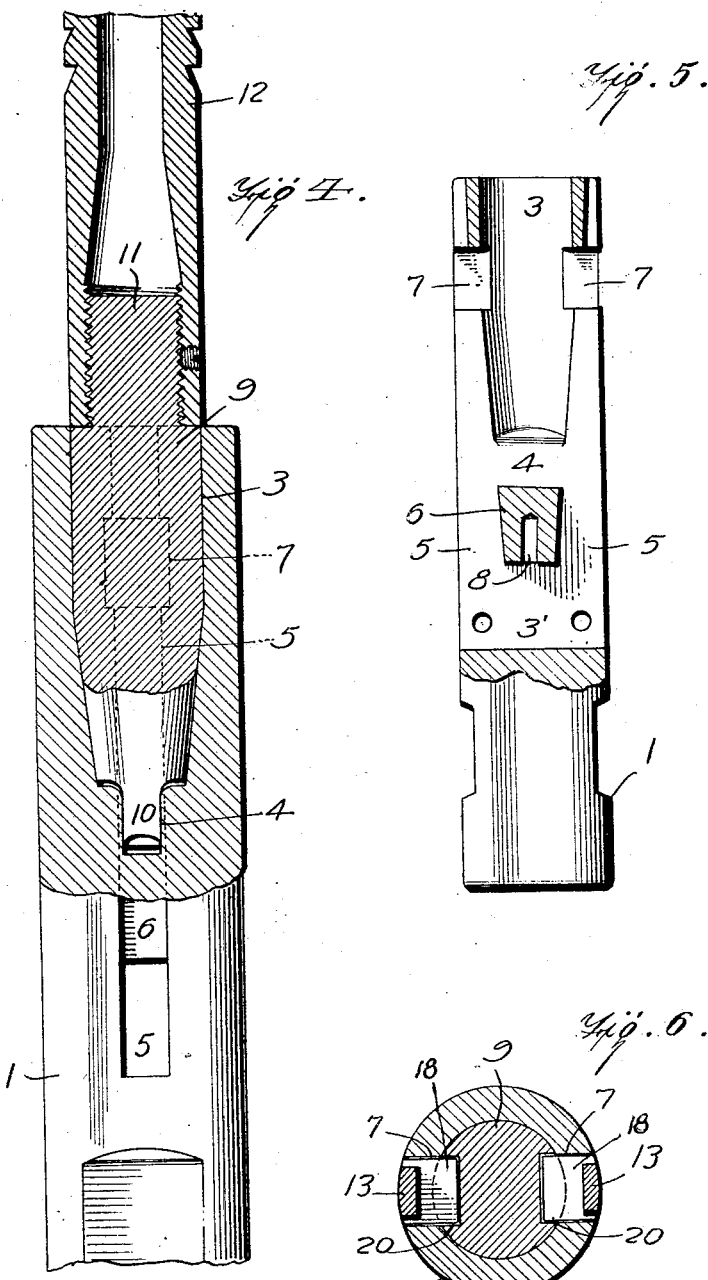

JOHN D. RUSS, OF SPENCER, WEST VIRGINIA.

OIL-WELL MACHINERY.

1,409,067. Specification of Letters Patent. Patented Mar. 7, 1922.

Application filed April 13, 1920. Serial No. 373,490.

*To all whom it may concern:*

Be it known that I, JOHN D. RUSS, citizen of the United States, residing at Spencer, in the county of Roane and State of West Virginia, have invented certain new and useful Improvements in Oil-Well Machinery, of which the following is a specification.

This invention is a variant from the form of releasable wire rope socket for oil-well machinery disclosed in my application for patent filed of even date herewith; and the object, in general, of the present invention is to present to the trade an alternative construction.

The invention is clearly disclosed in the accompanying drawing, forming part of my application, and in which like reference-characters denote corresponding parts throughout the several views. Briefly described:

Figure 1 is a view in elevation of the device of the present invention;

Figure 2 is a sectional view on the line 2—2, Fig. 1;

Figure 3 is a detached detail view, in perspective, of one of the pivoted locking-members;

Figure 4 is a fragmentary view, partly in section, of the device;

Figure 5 is a detached detail view, partly in section and partly in elevation, of the base-member of the device; and Figure 6 is a sectional view, on the line 6—6, Fig. 2.

Referring, now, in detail, to the drawings:

1 designates a base-member provided, at its lower end, with an axially-extending threaded recess 2 for the reception of the threaded end of a sinker-pin (not shown). The base-member is also provided with a cross-sectionally circular, axial chamber 3 extending from the other end thereof. A bridge 6, integral with the base member 1, and provided with a central, longitudinally-extending recess 8 in the lower portion thereof, divides said chamber 3 into two sections, an upper section and a relatively shorter lower section 3'; and, directly above said bridge 6, the chamber is provided with a constricted portion, or throat, 4, of non-circular cross section. At diametrically opposite points, said base-member 1 is longitudinally cut-away or slotted, as shown at 5, 5, the slots communicating with the chamber 3 and the section 3' thereof.

Toward its upper end, the base-member 1 is, at diametrically-opposite points, provided with peripheral recesses 7, 7, which intersect the slots 5, 5.

Adapted to be projected within the upper section of the chamber 3 is a cylindrical plug-member 9, cut away on each side, at the lower end thereof, to provide a toe 10 seated in the throat 4 and preventing rotation of the plug-member 9 relative to the base-member 1. The plug-member is provided, at its other end, with a reduced, threaded nipple 11, which is adapted to be engaged by the interiorly-threaded end of a tubular rope socket-member 12. The plug is also provided, at diametrically opposite points, with peripheral recesses 20, 20.

Locking members, herein shown as arms 13, 13, are provided for normally locking the plug-member 9 to the base-member 1, against withdrawal therefrom. Said arms are seated in the slots 5, 5, and are pivoted, at their lower ends, as shown at 14, on pivot pins 15, 15 carried by the base-member 1, and at said lower ends are provided with convergently and upwardly inclined toes 16, 16, bearing, at their extremities, against a disk 17 carried by a pin 18, slidably projecting into the recess 8 in the bridge 6. Around said pin, between said disk 17 and the under surface of the bridge 6, is disposed a helical spring 18', functioning, as is evident, to press down upon the toes 16, 16 through the disk 17, thus tending to maintain said locking-members in the normal locking position thereof, shown in full lines in Fig. 2. Said locking-arms 13, 13 carry, toward their upper ends, enlargements, or integral blocks 18, 18, adapted, in the normal or locking position of the arms, as shown in full lines in Fig. 2, to rest within the coincident recesses 7 and 20 of the base member 1 and the plug-member 9, respectively, as shown in Fig. 2. Said locking members 13, 13 are provided with convergently inclined upper ends 22, 22.

A wedge-member 21 (shown in Fig. 2) is adapted to fall, by gravity, down the wire rope which is held, at one end thereof, in the socket-member 12, and to move between the arms 13, 13, at their upper convergent ends 22, 22, thus rocking said arms outward on their pivots 15 and disengaging or withdrawing the locking-blocks 18, 18 from the coincident recesses 7 and 20; whereupon, the socket-member 12 and the attached plug 9 may be drawn upward by pulling upon the wire cable attached to said socket-member.

Having thus fully described my invention, what I claim as new and desire to secure by Letters Patent is:

1. A releasing-device for the cable-line of oil-well machinery, comprising a base-member adapted for engagement with a "sinker" and provided with an internal chamber; a plug-member projecting loosely into said chamber; pivoted locking-members carried by said base-member for normally preventing withdrawal of said plug-member from said base-member; and spring-controlled means for normally maintaining said locking-members in locking position.

2. A releasing-device for the cable-line of oil-well machinery, comprising a base-member adapted for engagement with a "sinker" and provided with an internal chamber; a plug-member projecting loosely into said chamber; pivoted locking-members carried by said base-member for normally preventing withdrawal of said plug-member from said base-member; and a spring-pressed member bearing against the pivotal ends of said locking-members for normally maintaining said locking-members in locking position.

3. A releasing-device for the cable-line of oil-well machinery, comprising a base-member adapted for engagement with a "sinker" and provided with an internal chamber; a plug-member projecting loosely into said chamber; pivoted locking-members carried by said base-member for normally preventing withdrawal of said plug-member from said base-member, and having convergently inclined toes; and a spring-pressed member bearing against said toes for normally maintaining said locking-members in locking position.

4. A releasing-device for the cable-line of oil-well machinery, comprising a base-member adapted for engagement with a "sinker" and provided with an internal chamber; a plug-member projecting loosely into said chamber; pivoted locking-members carried by said base-member for normally preventing withdrawal of said plug-member from said base-member, and having convergently inclined toes; and a spring-pressed member, carrying a guiding-stem, bearing against said toes for normally maintaining said locking-members in locking position.

In testimony whereof, I affix my signature.

JOHN D. RUSS.